(12) United States Patent
Sellnau et al.

(10) Patent No.: US 8,408,191 B2
(45) Date of Patent: Apr. 2, 2013

(54) ENGINE COMBUSTION CONTROL USING IGNITION DWELL

(75) Inventors: Mark C. Sellnau, Bloomfield Hills, MI (US); Chol-Bum Kweon, Bel Air, MD (US)

(73) Assignee: Delphi Technologies, Inc., Troy, MI (US)

(*) Notice: Subject to any disclaimer, the term of this patent is extended or adjusted under 35 U.S.C. 154(b) by 472 days.

(21) Appl. No.: 12/821,206

(22) Filed: Jun. 23, 2010

(65) Prior Publication Data

US 2011/0320104 A1  Dec. 29, 2011

(51) Int. Cl.
*F02P 1/00* (2006.01)

(52) U.S. Cl. ............ 123/594; 123/609; 123/406.18

(58) Field of Classification Search ............ 123/406.11, 123/406.18, 406.26, 478, 480, 594, 609
See application file for complete search history.

(56) References Cited

U.S. PATENT DOCUMENTS

| | | | |
|---|---|---|---|
| 4,166,437 A | 9/1979 | Bianchi et al. | |
| 4,377,140 A | 3/1983 | Latsch | |
| 4,417,556 A | 11/1983 | Latsch | |
| 4,622,939 A | 11/1986 | Matekunas | |
| 5,896,842 A | 4/1999 | Abusamra | |
| 5,992,386 A | 11/1999 | Nytomt et al. | |
| 6,032,650 A | 3/2000 | Rask | |
| 6,279,538 B1 | 8/2001 | Herweg et al. | |
| 6,614,230 B2 | 9/2003 | Raichle et al. | |
| 6,922,628 B2 | 7/2005 | Zhu et al. | |
| 7,028,478 B2 * | 4/2006 | Prentice, III | 60/645 |
| 7,104,043 B2 | 9/2006 | Zhu et al. | |
| 7,231,905 B1 | 6/2007 | Haskara et al. | |
| 7,290,442 B2 | 11/2007 | Zhu et al. | |
| 7,444,231 B2 | 10/2008 | Ancimer et al. | |
| 2008/0275621 A1 | 11/2008 | Kobayashi | |
| 2011/0047967 A1 * | 3/2011 | Bauer et al. | 60/273 |

OTHER PUBLICATIONS

Müller et al., Combustion Pressure Based Engine Management System, SAE 2000-01-0928.
Daniels, The Comparison of Mass Fraction Burned Obtained From the Cylinder Pressure Signal and Spark Plug ION Signal, SAE 980140.
Glavmo et al., Closed Loop Start of Combustion Control Utilizing Ionization Sensing in a Diesel Engine, SAE 1999-01-0549.
Peron et al., Limitizations of Ionization Current Sensors and Comparison With Sylinder Pressure Sensors, SAE 2000-01-2830.

(Continued)

*Primary Examiner* — John Kwon
(74) *Attorney, Agent, or Firm* — Lawrence D. Hazelton

(57) ABSTRACT

An engine control system, a controller for the engine control system, and a method of controlling a combustion process in an internal combustion engine operating at an engine operating condition. The engine control is based on closed-loop control of ignition dwell. Ignition dwell is defined as time or crank angle difference between an end of fuel injection (EOI), or some other aspect of an injection control signal, and a start of combustion (SOC), or some other aspect of an internal combustion event. One or more engine control devices, such as a fuel injector or an exhaust gas recirculation valve may be varied to control ignition dwell. By providing such a closed-loop engine control based on ignition dwell, the air/fuel charge mixture, and/or stratification present in the combustion chamber at the moment combustion starts may be controlled. Advanced combustion systems utilizing premixed compression ignition (PCI) offer the benefit of low temperature combustion for simultaneous low NOx and particulate emissions with high fuel economy. Combustion control based on ignition dwell can be used to optimize engine emissions and fuel consumption for PCI over the operating range.

17 Claims, 4 Drawing Sheets

OTHER PUBLICATIONS

Strandh et al., Ion Current Sensing for HCCI Combustion Feedback, SAE 2003-01-3216.
Vressner et al., Multiple Point Ion Current Diagnostics in an HCCI Engine, SAE 2004-01-0934.
Vressner et al., Fuel Effects on Ion Current in an HCCI Engine, SAE 2005-01-2093.
Joyce et al., Linear Regression and Its Use in Predicting the Link Between Ionization Current and the Pressure Signal in a Hybrid Mode Engine, SAE 2006-01-3278.
Abhijit et al., Ionization Signal Response During Combustion Knock and Comparison to Cylinder Pressure for SI Engines, SAE 2008-01-0981.
Huang et al., Effects of Engine Operating Conditions on In-Cylinder Air/Fuel Ratio Detection Using a Production Ion Sensing Device, SAE 2004-01-0515.
Förster et al., Ion Current Sensing for Spark Ignition Engines, SAE 1999-01-0204.
Zhu et al., MBT Timing Detection and Its Closed-Loop Control Using In-Cylinder Pressure Signal, SAE 2003-01-3266.
Huang et al., Investigation of an In-Cylinder Ion Sensing Assisted HCCI Control Strategy, SAE 2005-01-0068.
Malaczynski et al., Real-Time Digital Signal Processing of Ionization Current for Engine Diagnostic and Control, SAE 2003-01-1119.
Klövmark et al., Estimating the Air/Fuel Ration From Gaussian Parameterizations of the Ionization Currents in Internal Combustion SI Engines, SAE 2000-01-1245.
Sellnau et al., Cylinder-Pressure-Based Engine Control Using Pressure-Ratio-Management and Low-Cost Non-Intrusive Cylinder Pressure Sensor, SAE 2000-01-0932.
Polonowski et al., Accelerometer Based Sensing of Combustion in a High Speed HPCR Diesel Engine, SAE 2007-01-0972.

* cited by examiner

ENGINE COMBUSTION CONTROL USING IGNITION DWELL

TECHNICAL FIELD OF INVENTION

The invention generally relates to control of an internal combustion engine control, and more particularly relates to closed-loop control of ignition dwell by varying an engine control parameter.

BACKGROUND OF INVENTION

Internal combustion engine emissions regulations have become more stringent over time. Also, the demand for high fuel economy has increased greatly to conserve fuel and reduce green house gas emissions. Advanced combustion systems using premixed compression ignition offer the combined benefit of low temperature combustion to simultaneously reduce oxides of nitrogen (NOx) emissions and particulate emissions with high fuel economy. Examples of these systems include homogeneous charge compression ignition (HCCI), premixed low-temperature diesel combustion (PLTDC), and gasoline direct injection compression ignition (GDCI) see Kobayashi et al., "Internal Combustion Engine," US Patent Application US2008/0275621 A1. All of these systems require sufficient mixing of the fuel and air prior to compression ignition and heat release.

Variations in the combustion process may affect engine emission levels and/or fuel economy. Causes of such variation may in general be classified as either external causes such as changes in ambient temperature, pressure and humidity, and fuel properties or formulation; or internal causes such as engine aging, part to part variation within an engine, and engine to engine variation during manufacturing. These variations may change the state of fuel-air mixing or change the ignition delay period. This may lead to non-optimized combustion, especially when open-loop (OL) control is used. Various closed-loop (CL) combustion control strategies have been proposed. Some strategies use in-cylinder pressure sensors or in-cylinder ionization sensors to indicate combustion phase information by measuring a condition present in the combustion chamber indicative of when combustion of an air/fuel charge begins, ends, or is completed by a percentage. In general, CL combustion control can better compensate for variations in combustion due to the external and internal causes described above.

CL combustion control strategies using in-cylinder pressure sensors or in-cylinder ionization current sensors to provide one or more of several available control metrics have been proposed. For example, CL combustion control strategies using in-cylinder pressure sensors to determine a closed-loop control metric have been proposed that: a) determine a crank angle location when 50% of the fuel in the combustion chamber is burned (CA50), see Haskara et al., "Internal Combustion Engine Exhaust Gas Recirculation Control," U.S. Pat. No. 7,231,905; b) determine a crank angle location when a maximum combustion chamber pressure occurs, see Müller et al., "Combustion Pressure Based Engine Management System," Society of Automotive Engineers (SAE) 2000-01-0928; c) determine a maximum net pressure acceleration point, see Zhu et al., "MBT Timing Detection and its Closed-Loop Control Using In-Cylinder Pressure Signal," SAE 2003-01-3266; and d) use a combustion chamber pressure-ratio management (PRM) strategy, see Matekunas, "Engine Combustion Control with Ignition Timing by Pressure Ratio Management," U.S. Pat. No. 4,622,939 and Sellnau et al., "Cylinder-Pressure-Based Engine Control Using Pressure-Ratio-Management and Low-Cost Non-Intrusive Cylinder Pressure Sensors," SAE 2000-01-0932. For CL combustion control using ion sensors, several control metrics have been proposed such as: e) determining an end of ignition phase for spark-ignited gasoline engine, see Latsch, "Method and Apparatus for Closed-Loop Ignition Time Control," U.S. Pat. No. 4,377,140; and f) determining a start of combustion, see Huang et al., "Investigation of an In-cylinder Ion Sensing Assisted HCCI Control Strategy," SAE 2005-01-0068 and Raichle et al., "Method and Device for Evaluating an Ion Current Sensor Signal in an Internal Combustion Engine," U.S. Pat. No. 6,614,230. However, many CL combustion control strategies using in-cylinder pressure and ionization current sensors rely on control metrics that lead to complicated real-time algorithms that are difficult to calibrate. Advanced combustion systems may also require new control strategies to achieve both low emissions and high fuel economy. The choice of control metric for CL control is very important in order to deliver robust combustion control in an IC engine with less computational efforts and costs.

SUMMARY OF THE INVENTION

In accordance with one embodiment of this invention, an engine control system for controlling an internal combustion engine operating at an engine operating condition is provided. The system includes a combustion phase detection means, an engine control device, and a controller. The combustion phase detection means is configured to output a combustion phase signal indicative of a when combustion phase characteristic occurs. The engine control device is operable to control an engine control parameter in response to an engine control signal. The engine control parameter influences when the combustion phase characteristic occurs. The controller is configured to determine when a prior combustion phase signal occurs, determine a prior ignition dwell based on when the prior combustion phase signal occurs, and select a desired ignition dwell based on the engine operating condition. The controller is also configured to vary the engine control signal to cause a future ignition dwell that corresponds to the desired ignition dwell.

In another embodiment of the present invention, an engine controller for controlling an internal combustion engine operating at an engine operating condition is provided. The controller includes an input, an output, and a processor. The input is configured to receive a combustion phase signal indicative of a combustion phase characteristic. The output is configured to output an engine control signal effective to operate an engine control device and control an engine control parameter. The engine control parameter influences when the combustion phase characteristic occurs. The processor is configured to determine when a prior combustion phase signal occurs, and determine a prior ignition dwell based on when the prior combustion phase signal occurs. The processor is also configured to select a desired ignition dwell based on the engine operating condition, and to vary the engine control signal to cause a future ignition dwell that corresponds to the desired ignition dwell.

In yet another embodiment of the present invention, a method of controlling an internal combustion engine operating at an engine operating condition is provided. The method includes the steps of providing a combustion phase detection means configured to output a combustion phase signal indicative of when a combustion phase characteristic occurs, and providing an engine control device operable to control an engine control parameter in response to an engine control signal, wherein the engine control parameter influences when the combustion phase characteristic occurs. The method also includes the steps of determining a prior ignition dwell based on a when prior injector control signal occurs and when a prior combustion phase signal occurs. The method also includes the steps of selecting a desired ignition dwell based on the engine operating condition, and varying the engine control signal to cause a future ignition dwell that corresponds to the desired ignition dwell.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

In general, the following description is for closed-loop control of an internal combustion engine based on ignition dwell. As used herein, ignition dwell (IDW) is defined as the time or crank angle when a particular combustion phase characteristic of an internal combustion event occurs relative to some other engine control event such as a fuel injector control signal, or some mechanical reference such as when the crank is at some angle relative to top-dead-center. A non-limiting example of an injector control signal feature is a time or crank angle when the injection signal closes the fuel injector at the end of a main fuel pulse, i.e.—end of injection (EOI). A non-limiting example of a combustion phase characteristic is a time or crank angle when a predetermined fraction (e.g. 10%) of the fuel in the combustion chamber is consumed during an internal combustion event, i.e.—start of combustion (SOC).

The closed-loop control of an internal combustion engine described herein is generally directed toward compression ignition type engines. However, such controls may also be applied to spark ignition type engines as well, or hybrid compression ignition engines that use some form of spark ignition to assist with starting the engine during certain conditions such as cold weather. It is noted that, 'ignition dwell' as used herein should not be confused with the term 'dwell' as it is used with regard to charging an ignition coil present in some spark ignition systems. While not subscribing to any particular theory, it is believed that the duration of the ignition dwell influences the mixing and/or stratification of the air/fuel charge in the combustion chamber. By controlling an engine based on closed-loop control of the ignition dwell, the air/fuel charge mixing and/or stratification may optimized to minimize fuel consumption, exhaust emissions, smoke, and combustion noise. As such, the combustion process may be more consistent and so each of the combustion events may be more repeatable. The desired ignition dwell may vary due to changing engine operating conditions such as changing engine speed or temperature. If the ignition dwell is in terms of time, it can be readily transformed to be in terms of crank angle by multiplying the time by the present engine speed.

Figure 1:
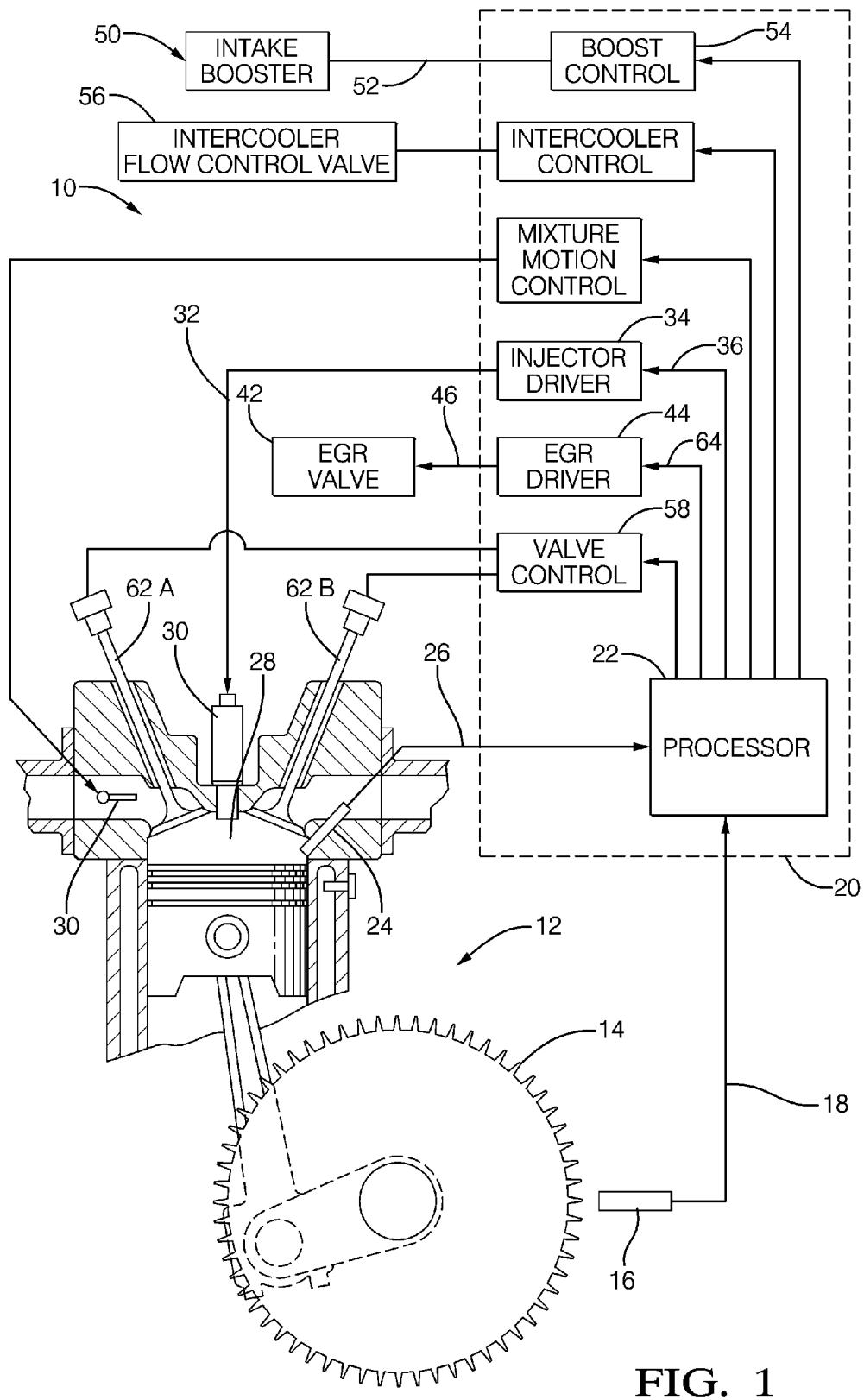
FIG. 1 is a block diagram of an engine control system in accordance with one embodiment.

Ignition dwell may be influenced by changing one or more of several engine control parameters. Engine control parameters that influence ignition dwell include, but are not limited to, air/fuel ratio, re-circulated or re-breathed exhaust gas fraction, injection timing relative to crank angle or other engine combustion event, pilot injection pulse to main injection pulse delay, injection pressure, injection rate, injection profile (i.e. how quickly the injection starts or stops), compression temperature, compression pressure, valve control timing, and swirl or tumble characteristics of the air/fuel charge present in the combustion chamber. The engine control parameters may each be changed or controlled by one or more engine control devices in response to changes in corresponding engine control signals. An exemplary, non-limiting group of engine control devices is shown in FIG. 1. Any one engine control device, or a combination of engine control devices, may be used to optimize combustion performance in response to changing engine operation conditions. Exemplary engine operating conditions may include, but are not limited to, engine speed or crank speed in revolutions per minute (RPM), ambient air temperature, air humidity, intake manifold air pressure, engine coolant temperature, injector fuel pressure, fuel formulation such as percent ethanol, and throttle valve position.

In accordance with an embodiment of an ignition dwell based engine control system, FIG. 1 illustrates an engine control system 10 for controlling an internal combustion engine 12 operating at an engine operating condition. The engine 12 is illustrated as having a single cylinder/piston arrangement that defines a combustion chamber 28; however it will be appreciated that the system 10 may be adapted to engines having multiple combustion chambers. The engine control system 10 may control an engine having multiple combustion chambers by individually controlling each of the multiple combustion chambers, or may control such an engine based on a signal from a sensor that is representative of a typical or average condition in each combustion chamber. The system 10 may include a crank wheel 14 and a crank sensor 16 positioned proximate to the crank wheel 14 such that the crank sensor 16 is able to sense rotational movement of the crank wheel teeth and output a crank signal 18 indicative of a crank angle and a crank speed.

The engine control system 10 may also include a controller 20, such as an engine control module (ECM), configured to determine a crank angle and a crank speed based on the crank signal 18. The controller 20 may include a processor 22 or other control circuitry as should be evident to those in the art. The controller 20 or processor 22 may include memory, including non-volatile memory, such as electrically erasable programmable read-only memory (EEPROM) for storing one or more routines, thresholds and captured data. The one or more routines may be executed by the processor 22 to perform steps for determining a prior ignition dwell and scheduling a future injection control signal such that a future ignition dwell corresponds to a desired ignition dwell. FIG. 1 illustrates the processor 22 and other functional blocks as being part of the controller 20. However, it will be appreciated that it is not required that the processor 22 and other functional blocks be assembled within a single housing, and that they may be distributed about the engine 12.

Continuing to refer to FIG. 1, the engine control system 10 may include a combustion phase detection means 24 configured to output a combustion phase signal 26 indicative of a combustion phase characteristic of a combustion event occurring within the combustion chamber 28. One way to monitor the progress of a combustion event is to determine a heat release rate or cumulative heat release for the combustion event, as will be discussed below in relation to FIG. 2. However, because of the number and complexity of measurements, determining heat release may not be suitable for controlling engines during field use such as when engines are operated in vehicles traveling in uncontrolled environments like public roadways. A combustion phase detection means suitable for field use may provide an indication of a combustion phase characteristic that can be correlated to laboratory type measurements such as heat release. Exemplary combustion phase detection means 24 include, but are not limited to, an ionization sensor configured to sense the ionization level of the combustion products in the combustion chamber 28, or a pressure sensor configured to sense the pressure within the combustion chamber 28. Another device that may be useful for indicating some aspect of the combustion process is a combustion knock sensor. The combustion phase detection means 24 may be any one of the exemplary sensors, or a combination of two or more sensors arranged to provide an indication of a combustion phase characteristic. The combustion phase detection means 24 may be incorporated into another device, such as incorporating an ionization sensor or a pressure sensor into a spark plug or a glow plug.

The engine control system 10 includes one or more an engine control devices operable to control an engine control parameter in response to an engine control signal, wherein the engine control parameter influences when the combustion phase characteristic occurs. One non-limiting example of an engine control device is a fuel injector 30 adapted to dispense fuel in accordance with an injector control signal 32 output by an injector driver 34 in response to an injection signal 36 output by the processor 22. In one embodiment, an exemplary engine control parameter may be a fuel injection profile that includes, but is not limited to, a main injection amount and a main injection pulse width. In another embodiment, the fuel injection profile may further include a pilot injection amount, a pilot injection pulse width, or a pilot injection to main injection delay. Other controllable aspects of the fuel injection profile may be how quickly or slowly the fuel injector 30 is turned on and/or turned off, or a fuel rate of fuel dispensed by the fuel injector 30 while the fuel injector 30 is on, or the number of pilot injection pulses preceding the main injection pulse. Varying one or more of these aspects of the fuel injections profile may be effective to control ignition dwell.

Figure 2:
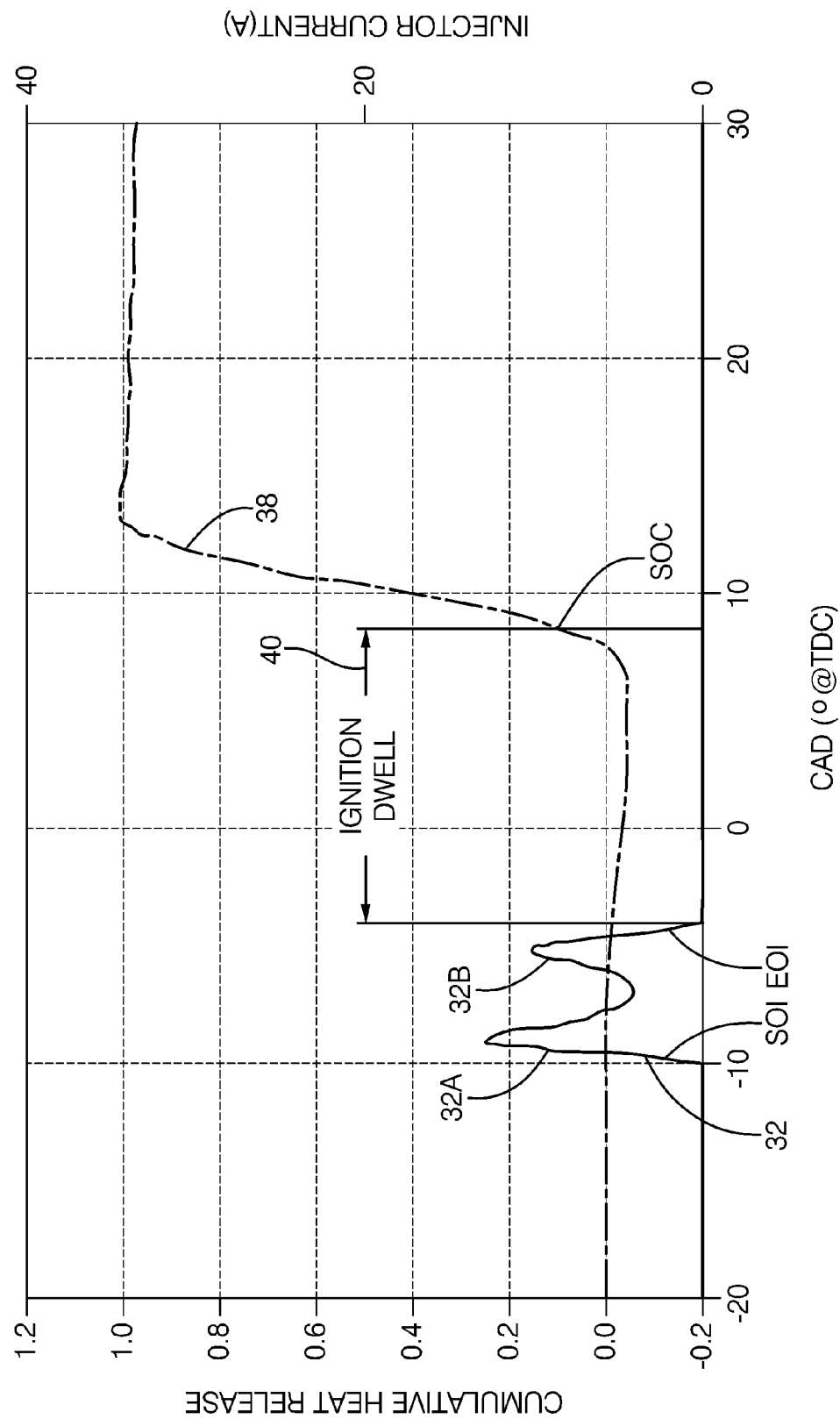
FIG. 2 is a graph of data present in the engine control system of FIG. 1 in accordance with one embodiment.

FIG. 2 illustrates a graph of data occurring about the engine control system 10 during an exemplary combustion event. The injector control signal 32 for an internal combustion event may be indicated by injector current and may comprise multiple pulses such a pilot injection pulse 32A and a main injection pulse 32B. A start of fuel injection (SOI) and/or end of fuel injection (EOI) for the main pulse may be defined according to an aspect of the injector control signal 32, as illustrated. Alternately, the injector control signal 32 for each internal combustion event may comprise only a main pulse defining the SOI and the EOI accordingly, or may comprise multiple pilot injection pulses and a main injection pulse, wherein the SOI is defined by the first pilot injection pulse.

FIG. 2 also illustrates an exemplary normalized cumulative heat release 38 curve indicating a combustion phase characteristic for a combustion event. In general, before combustion begins, such as prior to about 8 degrees after top-dead-center, the cumulate heat release value is about zero (0) since none of the air/fuel charge has burned. After all of the air/fuel charge has burned, for example after 12 crank angle degrees after top dead center, the combustion event has generally completed, and so the normalized cumulative heat release 38 has a value of about 1.0. It has been observed that some devices such as a combustion chamber ionization sensor or a combustion chamber pressure sensor provide a combustion phase signal 26 that is indicative of or corresponds to a state or phase of a combustion event. As such, the controller 20 or the processor 22 may be configured to receive the combustion phase signal 26. The controller 20 or processor 22 may analyze the combustion phase signal 26 to determine a time or crank angle that corresponds to when some combustion phase characteristic occurs.

A non-limiting example of a combustion phase characteristic is when a start of combustion (SOC) is indicated. For example, SOC may be when the combustion process according to heat release data has consumed ten percent (10%) of the air/fuel charge present in the combustion chamber. This SOC generally corresponds to a cumulative normalized heat release of about 0.1. If the combustion phase detection means 24 is an ionization sensor, the combustion phase signal 26 may be compared to a threshold to indicate when a SOC occurs. In one embodiment, the time or crank angle that the ionization level indicated by the ionization current exceeds a threshold may be used to indicate that SOC has occurred. Alternately, if the combustion phase detection means 24 is a pressure sensor, the combustion phase signal 26 may be compared to a threshold and the time or crank angle that the pressure exceeds a threshold may be used to indicate that SOC has occurred. If signals from more than one device are used, the controller 20 or processor 22 may combine or compare the individual signals to determine when the SOC or other combustion phase characteristic has occurred. Either way, it has been observed that a combustion phase signal 26 may be correlated to a combustion phase characteristic, such as the cumulative heat release 38, so that the phase of a combustion event may be tracked by monitoring the combustion phase signal 26.

In one embodiment, an end of main injection (EOI) may be varied to control the ignition dwell (IDW). It follows that the prior injector control signal may indicate when to a prior end of main injection occurs, and the future injector control signal may indicate when to a future end of main injection occurs. Basing the engine control system 10 on the EOI is intuitively simple to understand. However it is understood that for the injection to be complete at a desired time or crank angle, the engine control system must start the injection process accordingly. As such, in another embodiment, a start of main injection (SOI) may be varied to control the ignition dwell (IDW). It follows that the prior injector control signal may be indicated a prior start of a main injection pulse or a prior start of a pilot pulse, and the future injector control signal may be indicated by a future start of main injection or a future start of a pilot pulse.

Referring again to FIG. 1, the controller 20 or the processor 22 may be configured to determine when a prior combustion phase signal occurs. For example, a prior combustion phase characteristic such as cumulative heat release 38 equal to or becoming greater than 0.1 may be indicated by the combustion phase signal 26 becoming greater than a threshold. The controller 20 or the processor 22 may be configured to determine a prior ignition dwell based on when the prior combustion phase signal occurs. In one embodiment, the prior ignition dwell corresponds to the illustration of ignition dwell 40 illustrated in FIG. 2, and so would be based on an interval, time or crank angle, between a prior injector control signal, such as injector control signal 32, and a prior combustion phase characteristic, such as when the normalized cumulative heat release becomes greater than 0.1.

In one embodiment the combustion phase detection means includes an ionization sensor, and so the combustion phase signal is indicative of a combustion chamber ionization level. In such an embodiment the start of combustion may be indicated when the ionization sensor indicates that the ionization level has become greater than an ionization threshold. In another embodiment, the combustion phase detection means includes a pressure sensor, and so the combustion phase signal is indicative of a combustion chamber pressure. In this embodiment the start of combustion is indicated when the pressure sensor indicates that the combustion chamber pressure has become greater than a combustion chamber pressure threshold.

The controller 20 or the processor 22 may also be configured to select a desired ignition dwell based on the engine operating condition. The desired ignition dwell may be selected from a predetermined look up table, or calculated using a predetermined formula, and may be selected based on one or more of the engine operating conditions described above. The controller 20 or the processor 22 may also be configured to vary the engine control signal, and thereby vary an engine control device operable to closed-loop control an engine control parameter responding to an engine control signal, wherein the engine control parameter influences when the combustion phase characteristic occurs, to cause or influence a future ignition dwell that corresponds to the desired ignition dwell. The engine control signal may be varied according to a simple error term equal to a difference between the prior ignition dwell and the desired ignition dwell, or may be part of a more sophisticated algorithm, such as a proportional/integral/differential or derivative (PID) type algorithm. In one embodiment, the engine control signal may be varied so that the future ignition dwell is expected to be equal to the desired ignition dwell. As such, the difference between the desired ignition dwell and the prior ignition dwell may be useful to adjust the engine control system 10 in a closed-loop manner to provide subsequent ignition dwells that are closer in value to the desired ignition dwell. It follows that the controller 20 or the processor 22 may be configured to schedule a future injector control signal based on the desired ignition dwell and so closed-loop adjust that future injector control signal based on the prior injector control signal and the prior ignition dwell.

In another embodiment, engine control system 10 may include an exhaust gas recirculation (EGR) valve 42. While not explicitly shown, it is understood by those familiar with the art of engine control that the EGR valve regulates a rate or amount of engine exhaust gas that is mixed with fresh air being supplied to the engine to dilute the percentage of oxygen and/or nitrogen in the air mixture received into the combustion chamber 28. The controller 20 may include an EGR driver 44 that outputs an EGR control signal 46 to control the position of the EGR valve 42. The EGR driver may, for example, pulse width modulate a voltage to generate an EGR control signal 46 effective to control the EGR valve to regulate the flow rate of exhaust gases received by the engine 12. It has been observed that the rate or amount of exhaust gas mixed with fresh air that is received by the engine 12 affects the ignition dwell. As such, the EGR control signal 46, rather than the injector control signal 32, may be varied to obtain a future ignition dwell that corresponds to a desired ignition dwell. As such, the EGR rate may be optimized based on ignition dwell, while injection timing would be determined based on a predetermined engine calibration mapping table. It should be appreciated that, in a similar manner, any of the engine control devices listed above or illustrated in FIG. 1 that influence ignition dwell when varied may be closed-loop controlled to provide a future ignition dwell that corresponds to the desired ignition dwell. It should also be appreciated that combinations of two or more such engine control devices may be controlled in a cooperative manner to provide a future ignition dwell that corresponds to the desired ignition dwell. For example, in one embodiment the engine control device may include both an EGR valve and a fuel injector, and so the engine control parameter includes both EGR flow rate and a fuel injection profile. As such, the device control signal further comprises both the EGR control signal 46 and the injector control signal 32.

Figure 3:
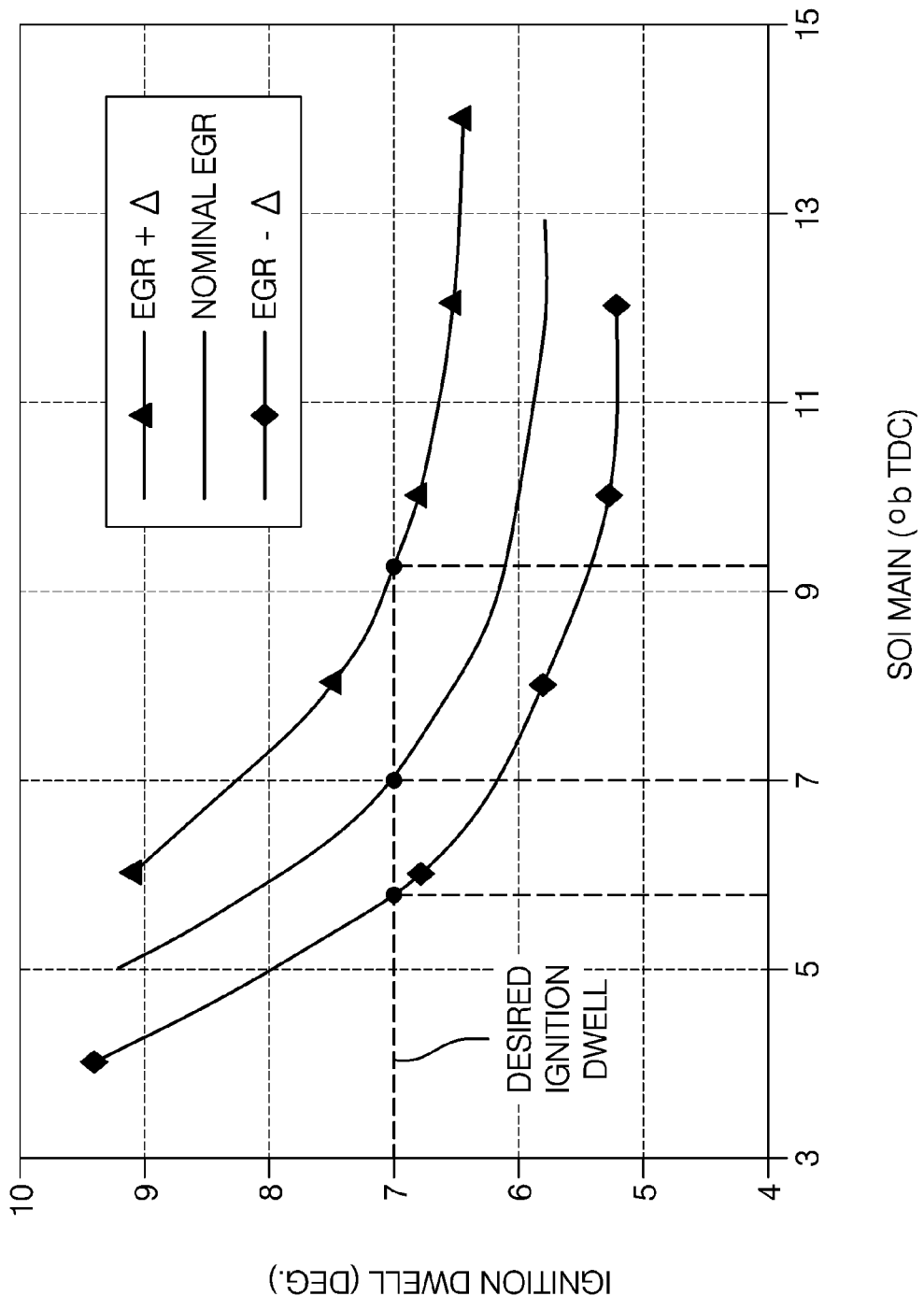
FIG. 3 is a graph of a signal compensation present in the engine control system of FIG. 1 in accordance with one embodiment.

FIG. 3 is a graph that illustrates the combined effect that EGR rate and injector timing has on ignition dwell. The three curves correspond to Nominal EGR, EGR+Δ, and EGR−Δ. It will be appreciated that it is not necessary that the upper and lower EGR rate curves correspond to the same offset (Δ), but is shown that way here only for convenience. Such a graph may be developed using empirical laboratory data taken from the engine 12 and/or a computer model of the engine 12. The Desired Ignition dwell may be determined based on one or more of the engine operating conditions described above. As illustrated, the dependence of ignition dwell on EGR rate and injection timing may be exploited to optimally control EGR and ignition timing together based on a desired ignition dwell. However, if the slope of the curve indicates that changing the EGR rate will have little effect on the Ignition Dwell, then the EGR rate may be held at some fixed value, and the closed loop control would only be based on changing some other engine control parameter such as injector timing. For example, according exemplary to FIG. 3, if the start of main injection (SOI) is greater than about 10 degrees, the slope of the curve indicates that changing the SOI by one degree will cause much less than one degree of change in the ignition delay, and so changing the EGR rate may be more effective to control the ignition delay. Contrariwise, if the SOI is less than about 7 degrees, the slope of the curve indicates that changing the SOI by one degree will cause a change in the ignition delay of about one degree, and so changing the SOI may be preferable to control the ignition deafly. It will be appreciated that FIG. 3 could be readily converted to be based on the end of main injection (EOI).

Referring again to FIG. 1, the engine control system 10 may include other engine control devices. For example the engine control system 10 may include an intake booster device 50 such as a turbocharger or a supercharger. The intake booster device 20 receives a booster control signal 52 from a boost control block 54 that may control a boost pressure by controlling the position of a waste gate or bypass valve, or controlling a vane position in a variable geometry turbocharger. The engine control system 10 may also include an intercooler flow control valve 56 that regulates the flow of engine coolant through the intercooler for warming the engine intake air when the ambient air temperature is low, thereby controlling the temperature of air received by the engine 12. The engine control system 10 may also include a valve control block 58 that may directly control the actuation of engine valves 62A and 62B, or may control the phase of a cam (not shown) actuating the engine valves 62A and/or 62B. It should be appreciated that in a manner similar to that described above, closed-loop control based on ignition dwell may be used to closed-loop control or optimize any one of the engine control devices suggested, while values for some or all the other engine control devices may be determined open-loop based on one or more of the engine operating conditions. Alternately, a plurality of the engine control devices suggested may be simultaneously closed-loop controlled to optimize ignition dwell, or may be sequentially (i.e.—one at a time) selected to be varied closed-loop to optimize ignition dwell.

Figure 4:
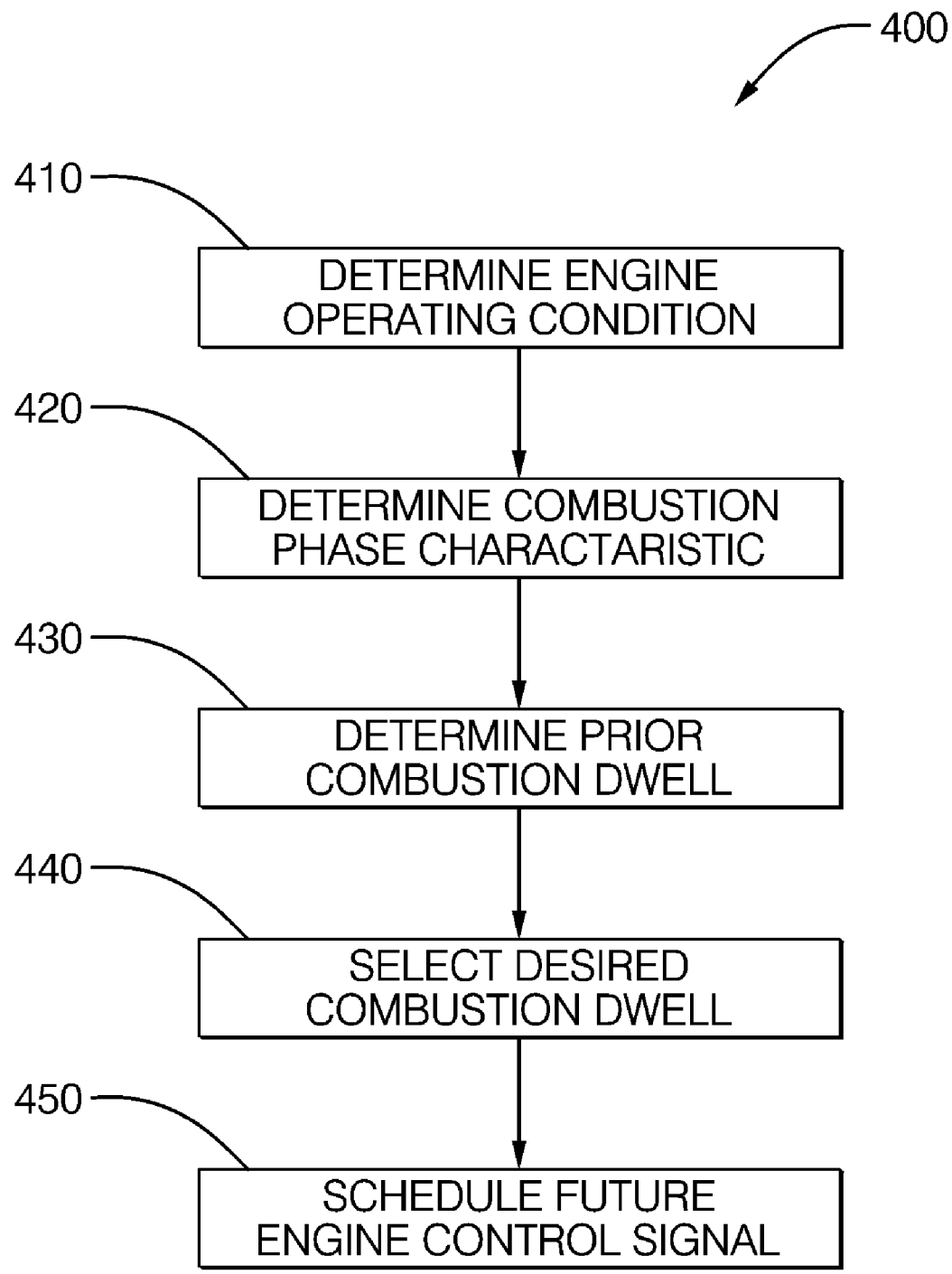
FIG. 4 is a flowchart of a method to control an internal combustion engine in FIG. 1 in accordance with one embodiment.

FIG. 4 shows an embodiment of a routine or a method 400 for controlling an internal combustion engine 12 operating at an engine operating condition. The method 400 may include providing a combustion phase detection means 24 configured to output a combustion phase signal 26 indicative of a combustion phase characteristic. The method 400 may also include providing a fuel injector 30 adapted to dispense fuel in accordance with an injector control signal 32. At step 410, an engine operating condition is determined. For example, the controller 20 or processor 22 may determine an operating condition such as the engine speed by analyzing the crank signal 18 from the crank sensor 14 to determine the rotational speed and angle of the crank wheel 14. In addition, the controller 20 may receive signals from other engine sensors (not shown) such as a coolant temperature sensor, an intake air mass flow meter, an intake air throttle valve position, or an exhaust oxygen sensor.

Continuing to refer to method 400, at step 420, a combustion phase characteristic of a prior combustion event is determined. The combustion phase characteristic may be indicated by a combustion phase detection means 24 coupled to the combustion chamber 12 and outputting a combustion phase signal 26 indicative of when a prior combustion phase characteristic occurs. Examples of devices suitable to output a combustion phase signal 26 for providing an indication of when the combustion phase characteristic occurs include, but are not limited to, a combustion chamber ionization sensor and a combustion chamber pressure sensor. In one embodiment, the combustion phase characteristic may be determined based on the combustion signal becoming greater than a threshold. At step 430, a prior ignition dwell is determined. In one embodiment, the ignition dwell may be based on a time or crank angle difference between a prior end of injection (EOI), such as that indicated by the injector control signal 32, and a start of combustion (SOC) such as that indicated by the combustion phase signal 26.

At step 440, a desired ignition dwell is selected based on the engine operating condition determined at step 410. In one embodiment, the engine operating condition may be an engine speed in revolutions per minute (RPM) as provided by the crank sensor 16. Other engine operating conditions are known to be useful for controlling the internal combustion engine 12. Signals indicating these operating conditions may be supplied to the controller 20 by devices known to be suitable for such a purpose. At step 450, a future engine control signal is scheduled based on the desired ignition dwell determined in step 440 and the prior ignition dwell determined in step 430. The engine control signal may be, but is not limited to an injector control signal 36 or an EGR control signal 64. The processor 20 may output temporally distinct engine control signals to vary one of the engine control devices (injector 30, EGR valve 42, intake booster 52, intercooler flow control valve 56, or valves 62A, 62B) at a time, or may simultaneously vary two or more signals to vary a corresponding two or more engine control devices for each upcoming engine combustion event. The method may also include steps for selecting which engine control device(s) should be used to control the ignition dwell, such as selecting an engine control device having the greatest range of effect on the ignition dwell, having a certain sensitivity, having the greatest effect on ignition dwell based on the present engine operating conditions, or sequentially stepping through a plurality of engine control devices to determine which engine control device provides a desired influence on the ignition dwell.

Accordingly, an engine control system 10, a controller 20 for the engine control system 10, and a method 400 of closed-loop controlling an internal combustion engine operating at an engine operating condition is provided. The engine exhibits an ignition dwell that in one embodiment corresponds to a time or crank angle between an end of fuel injection (EOI), or some other aspect of an injection control signal, and a start of combustion (SOC), or some other aspect of an internal combustion event. A desired ignition dwell is selected based on an operating condition of the engine. The desired ignition dwell is compared to a previous ignition dwell indicated by the EOI and SOC, and then an engine control device is controlled in a closed-loop manner to provide a future ignition dwell that corresponds to or matches the desired ignition dwell. By providing such a closed-loop engine control based on ignition dwell, the air/fuel charge mixture, and/or stratification present in the combustion chamber at the moment combustion starts may be more consistent, and so engine emissions may be more consistently controlled.

While this invention has been described in terms of the preferred embodiments thereof, it is not intended to be so limited, but rather only to the extent set forth in the claims that follow.

We claim:

1. An engine control system for controlling an internal combustion engine operating at an engine operating condition, said system comprising:
   a combustion phase detection means configured to output a combustion phase signal indicative of when a combustion phase characteristic occurs;
   an engine control device operable to control an engine control parameter in response to an engine control signal, wherein the engine control parameter influences when the combustion phase characteristic occurs; and
   a controller configured to determine when a prior combustion phase signal occurs, determine a prior ignition dwell based on when the prior combustion phase signal occurs, select a desired ignition dwell based on the engine operating condition, and vary the engine control signal to cause a future ignition dwell that corresponds to the desired ignition dwell.

2. The system in accordance with claim 1, wherein the internal combustion engine is a compression ignition type engine.

3. The system in accordance with claim 2, wherein the internal combustion engine is a gasoline direct injection type engine.

4. The system in accordance with claim 1, wherein the combustion phase characteristic occurs when a start of combustion occurs.

5. The system in accordance with claim 4, wherein the combustion phase detection means comprises an ionization sensor, the combustion phase signal is indicative of a combustion chamber ionization level, and the start of combustion is indicated when the ionization sensor indicates that the ionization level has become greater than an ionization threshold.

6. The system in accordance with claim 4, wherein the combustion phase detection means comprises a pressure sensor, the combustion phase signal is indicative of a combustion chamber pressure, and the start of combustion is indicated when the pressure sensor indicates that the combustion chamber pressure has become greater than a combustion chamber pressure threshold.

7. The system in accordance with claim 4, wherein the start of combustion corresponds to when ten percent (10%) of a cylinder fuel charge is combusted.

8. The system in accordance with claim 4, wherein ignition dwell is defined as the interval between when the start of combustion occurs and when a corresponding end of injection of a main fuel injection pulse occurs.

9. The system in accordance with claim 1, wherein
the prior ignition dwell is based on an interval between when a prior end of main injection occurs and when a corresponding prior start of combustion occurs; and
the future ignition dwell is based on an interval between when a future end of main injection occurs and when a corresponding future start of combustion occurs.

10. The system in accordance with claim 1, wherein the engine control device comprises a fuel injector, the engine control parameter comprises a fuel injection profile, the device control signal comprises an injector control signal, and the fuel injection profile comprises a main injection amount and a main injection pulse width.

11. The system in accordance with claim 10, wherein the fuel injection profile further comprises a pilot injection amount, a pilot injection pulse width, and a pilot injection to main injection delay.

12. The system in accordance with claim 1, wherein the engine control device comprises an exhaust gas recirculation valve, and the engine control parameter comprises an exhaust gas recirculation flow rate.

13. The system in accordance with claim 12, wherein the engine control device further comprises a fuel injector, the engine control parameter further comprises a fuel injection profile, the device control signal further comprises an injector control signal, and the fuel injection profile comprises a main injection amount and a main injection pulse width.

14. An engine controller for controlling an internal combustion engine operating
at an engine operating condition, said controller comprising:
an input configured to receive a combustion phase signal indicative of a combustion phase characteristic;
an output configured to output an engine control signal effective to operate an engine control device and control an engine control parameter, wherein the engine control parameter influences when the combustion phase characteristic occurs; and
a processor configured to determine when a prior combustion phase signal occurs, determine a prior ignition dwell based on when the prior combustion phase signal occurs, select a desired ignition dwell based on the engine operating condition, and vary the engine control signal to cause a future ignition dwell that corresponds to the desired ignition dwell.

15. A method of controlling an internal combustion engine operating at an engine operating condition, said method comprising the steps of:
providing a combustion phase detection means configured to output a combustion phase signal indicative of when a combustion phase characteristic occurs;
providing an engine control device operable to control an engine control parameter in response to an engine control signal, wherein the engine control parameter influences when the combustion phase characteristic occurs;
determining a prior ignition dwell based on a when prior injector control signal occurs and when a prior combustion phase signal occurs;
selecting a desired ignition dwell based on the engine operating condition; and
varying the engine control signal to cause a future ignition dwell that corresponds to the desired ignition dwell.

16. The method in accordance with claim 15, wherein the method further comprises the step of:
determining the combustion phase characteristic based on the combustion signal becoming greater than a threshold.

17. The method in accordance with claim 15, wherein the method further comprises determining a prior end of main injection base on when the prior injector control signal occurs.

* * * * *